US012651472B2

(12) United States Patent
Nishiyama

(10) Patent No.: US 12,651,472 B2
(45) Date of Patent: Jun. 9, 2026

(54) IMAGE PROCESSING APPARATUS AND NON-TRANSITORY COMPUTER-READABLE STORAGE MEDIUM STORING IMAGE PROCESSING PROGRAM TO PROCESS IMAGE DATA GENERATED BY READING AN ORIGINAL DOCUMENT

(71) Applicant: SEIKO EPSON CORPORATION, Tokyo (JP)

(72) Inventor: Kazuhiro Nishiyama, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 268 days.

(21) Appl. No.: 18/484,476

(22) Filed: Oct. 11, 2023

(65) Prior Publication Data

US 2024/0127615 A1 Apr. 18, 2024

(30) Foreign Application Priority Data

Oct. 17, 2022 (JP) ................................. 2022-166064

(51) Int. Cl.
| | |
|---|---|
| *G06V 30/14* | (2022.01) |
| *G06F 16/53* | (2019.01) |
| *G06F 16/58* | (2019.01) |
| *G06F 16/93* | (2019.01) |
| *G06V 30/18* | (2022.01) |
| *G06V 30/19* | (2022.01) |
| *G06V 30/41* | (2022.01) |

(52) U.S. Cl.
CPC .......... *G06V 30/1448* (2022.01); *G06F 16/53* (2019.01); *G06F 16/5866* (2019.01); *G06F 16/93* (2019.01); *G06V 30/18105* (2022.01); *G06V 30/19007* (2022.01); *G06V 30/41* (2022.01)

(58) Field of Classification Search
None
See application file for complete search history.

(56) References Cited

U.S. PATENT DOCUMENTS

| | | | | |
|---|---|---|---|---|
| 9,854,121 B2 * | 12/2017 | Nakamura | ........... | H04N 1/2179 |
| 2008/0187221 A1 | 8/2008 | Konno et al. | | |
| 2011/0058228 A1 * | 3/2011 | Inamoto | ............... | G06V 30/224 |
| | | | | 358/448 |
| 2020/0162624 A1 * | 5/2020 | Tsukada | ............. | H04N 1/00217 |
| 2020/0311980 A1 * | 10/2020 | Shinohara | ............. | G06F 16/164 |
| 2021/0295032 A1 * | 9/2021 | Kosaka | ................. | G06V 30/414 |
| 2021/0303842 A1 * | 9/2021 | Adachi | ................. | G06V 30/412 |

FOREIGN PATENT DOCUMENTS

| | | | |
|---|---|---|---|
| JP | 2008192032 A | | 8/2008 |
| JP | 2017046086 A | * | 3/2017 |

\* cited by examiner

*Primary Examiner* — Bernard Krasnic
(74) *Attorney, Agent, or Firm* — CHIP LAW GROUP

(57) ABSTRACT

An image processing apparatus includes a control unit configured to acquire image data generated through reading of an original document, and acquire, through character recognition, a character string included in the image data. The control unit performs a first process and a second process. The first process is configured to acquire, through character recognition, the character string of which region is designated with a first identification mark in the image data, and a second identification mark differing from the first identification mark is further added to the character string. The second process uses the character string acquired in the first process.

13 Claims, 6 Drawing Sheets

| FOLDER | DESIGNATED CHARACTER STRING |
|---|---|
| ¥nouhin | DELIVERY STATEMENT |
| ¥seikyu | INVOICE |
| ··· | ··· |

FIG. 4

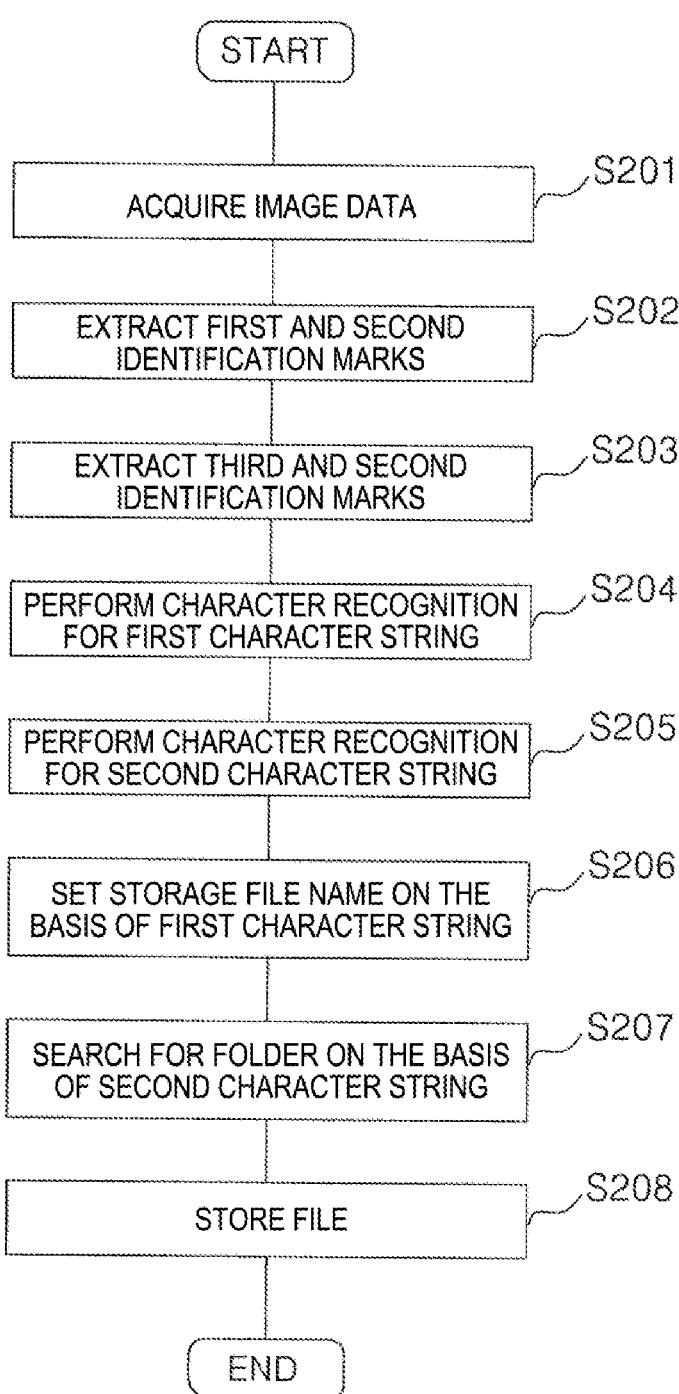

START

ACQUIRE IMAGE DATA — S201

EXTRACT FIRST AND SECOND IDENTIFICATION MARKS — S202

EXTRACT THIRD AND SECOND IDENTIFICATION MARKS — S203

PERFORM CHARACTER RECOGNITION FOR FIRST CHARACTER STRING — S204

PERFORM CHARACTER RECOGNITION FOR SECOND CHARACTER STRING — S205

SET STORAGE FILE NAME ON THE BASIS OF FIRST CHARACTER STRING — S206

SEARCH FOR FOLDER ON THE BASIS OF SECOND CHARACTER STRING — S207

STORE FILE — S208

END

FIG. 6

IMAGE PROCESSING APPARATUS AND NON-TRANSITORY COMPUTER-READABLE STORAGE MEDIUM STORING IMAGE PROCESSING PROGRAM TO PROCESS IMAGE DATA GENERATED BY READING AN ORIGINAL DOCUMENT

The present application is based on, and claims priority from JP Application Serial Number 2022-166064, filed on Oct. 17, 2022, the disclosure of which is hereby incorporated by reference herein in its entirety.

BACKGROUND

1. Technical Field

The present disclosure relates to an image processing apparatus and an image processing program, which are configured to process image data generated by reading an original document.

2. Related Art

Typically, through character recognition using an optical character reader (OCR), data entered in a designated entry location are acquired from read data of a sheet obtained using a scanner. For example, JP-A-2008-192032 discloses a method of applying marking to a character string stated in advance on a sheet serving as the target of reading, and designating an attribute name to be given to attribute data acquired from the sheet.

In a case of a method of applying marking to a sheet to designate a region where character recognition is performed using the OCR, when marking is performed from the beginning regardless of whether or not reading is performed, character recognition is performed on the basis of this marking. That is, a character string differing from the target character string is wrongly recognized, and a desired result of character recognition may not be obtained.

SUMMARY

An image processing apparatus according to the present disclosure used to solve the problem described above provides an image processing apparatus including a control unit configured to acquire image data generated through reading of an original document, and acquire, through character recognition, a character string included in the image data, in which the control unit performs a first process and a second process, the first process being configured to acquire, through character recognition, the character string of which region is designated with a first identification mark in the image data, and to which a second identification mark is further added, the second identification mark differing from the first identification mark, the second process using the character string acquired in the first process.

In addition, a non-transitory computer-readable storage medium storing an image processing program according to the present disclosure provides an image processing program that causes an image processing apparatus to perform a process to image data generated through reading of an original document, the image processing program causing the image processing apparatus to perform a first process of acquiring, through character recognition, the character string of which region is designated with a first identification mark in the image data, and to which a second identification mark is further added, the second identification mark differing from the first identification mark, and a second process using the character string acquired in the first process.

BRIEF DESCRIPTION OF THE DRAWINGS

FIG. 4 is a diagram illustrating one example of folders and designated character strings.

FIG. 6 is a flowchart showing a flow of process achieved by an image processing program.

DESCRIPTION OF EMBODIMENTS

Figure 1:
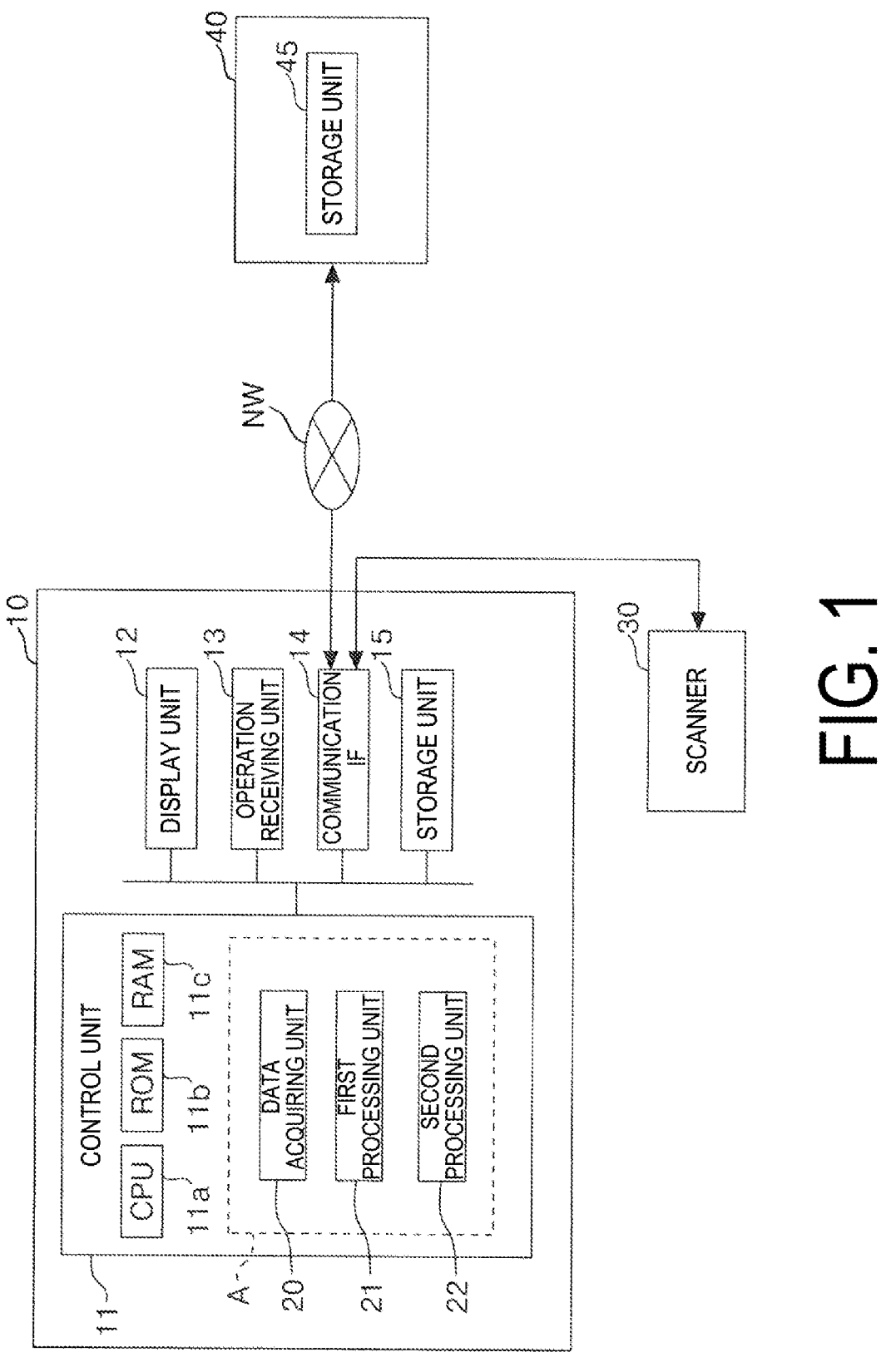
FIG. 1 is a block diagram illustrating configurations of an image processing apparatus and a unit configured to communicate with the image processing apparatus.

Below, the present disclosure will be schematically described.

An image processing apparatus according to a first aspect provides an image processing apparatus including a control unit configured to acquire image data generated through reading of an original document, and acquire, through character recognition, a character string included in the image data, in which the control unit performs a first process and a second process. The first process is configured to acquire, through character recognition, the character string of which region is designated with a first identification mark in the image data, and to which a second identification mark is further added, the second identification mark differing from the first identification mark. The second process uses the character string acquired in the first process.

With the present aspect, through character recognition, the control unit is configured to acquire the character string of which region is designated with the first identification mark in the image data. The character string also has a second identification mark further added thereto, and the second identification mark differs from the first identification mark. Thus, it is possible to favorably suppress erroneous recognition, as compared with a case where only the first identification mark is used to designate a region where character recognition is performed.

In the first aspect, a second aspect is configured such that the second process is a process of comparing the character string with a folder name of a folder in a storage unit that stores the image data, and storing the image data in a folder having the folder name that at least partially matches at least a portion of the character string.

With the present aspect, the second process is a process of comparing the character string with a folder name of a folder in the storage unit that stores the image data, and storing the image data in a folder having the folder name, at least a portion of the folder name matching at least a portion of the character string. This eliminates the need for a user to designate the storage destination for the image data for each time, which improves the usability.

In the first aspect, a third aspect is configured such that the second process is a process of comparing the character string with a designated character string associated with a folder in a storage unit that stores the image data, and when at least a portion of the designated character string matches the character string, storing the image data in a folder corresponding to the designated character string.

With the present aspect, the second process is a process of comparing the character string with a designated character string associated with a folder in a storage unit that stores the image data, and when at least a portion of the designated character string matches the character string, storing the image data in a folder corresponding to the designated character string. This eliminates the need for a user to designate the storage destination for the image data, which improves the usability.

In addition, with the present aspect, the character string acquired through character recognition and the folder name do not need to be directly associated with each other. Thus, the degree of freedom in setting a folder name increases.

In the second or third aspect, a fourth aspect is configured such that the storage unit is a storage unit included in a cloud server.

With the present aspect, when the storage unit is a storage unit included in a cloud server, it is possible to obtain operation and effect of the second or third aspect described above.

In the first aspect, a fifth aspect is configured such that the character string is set as a first character string, a character string included in the image data and differing from the first character string is set as a second character string, in the first process, the control unit acquires, through character recognition, the second character string of which region is designated with a third identification mark in the image data, the third identification mark being disposed at a position differing from the first identification mark, the third identification mark having a color differing from the first identification mark, the second identification mark being further added to the second character string, and in the second process, the control unit performs a process using the first character string and the second character string acquired in the first process.

With the present aspect, in addition to the first character string, the second character string differing from the first character string is used. This makes it possible to expand the variation in the second process, which makes it possible to further improve the usability.

In the fifth aspect, a sixth aspect is configured such that the second process includes: a process of setting a file name of the image data to be a file name including the first character string; and a process of comparing the second character string with a folder name of a folder in a storage unit that stores the image data, and storing the image data in a folder having the folder name, at least a portion of the folder name matching at least a portion of the second character string.

The present aspect eliminates the need for a user to designate the file name of the image data in addition to the storage destination for the image data for each time, which improves the usability.

In the fifth aspect, a seventh aspect is configured such that the second process includes: a process of setting a file name of the image data to be a file name including the first character string; and a process of comparing the second character string with a designated character string associated with an existing folder in a storage unit that stores the image data, and when at least a portion of the designated character string matches at least a portion of the second character string, storing the image data in a folder corresponding to the designated character string.

The present aspect eliminates the need for a user to designate the file name of the image data in addition to the storage destination for the image data for each time, which improves the usability.

Furthermore, with the present aspect, the second character string acquired through character recognition and the folder name do not need to be directly associated with each other. Thus, the degree of freedom in setting a folder name increases.

In the first aspect, an eighth aspect is configured such that the first identification mark is a line of a predetermined color, and is configured to include a line surrounding the character string, the second identification mark includes a line intersecting the first identification mark and is a mark smaller than a size of the first identification mark, and when the second identification mark is added together with the first identification mark, the control unit acquires, through character recognition, the character string of which region is designated with the first identification mark.

With the present aspect, the first identification mark is a line of a predetermined color and configured to include a line surrounding the character string. Thus, it is possible to easily designate the character string to be subjected to character recognition. In addition, the second identification mark includes a line intersecting the first identification mark, and is a mark having a size smaller than the first identification mark. Thus, it is possible to reliably recognize the pair of the first identification mark and the second identification mark.

Note that the present aspect is not limited to the first aspect, and may be applied to any of the second to seventh aspects.

A non-transitory computer-readable storage medium storing an image processing program according to a ninth aspect provides an image processing program that causes an image processing apparatus to perform a process to image data generated through reading of an original document, the image processing program causing the image processing apparatus to perform: a first process of acquiring, through character recognition, the character string of which region is designated with a first identification mark in the image data, and to which a second identification mark is further added, the second identification mark differing from the first identification mark; and a second process using the character string acquired in the first process.

With the present aspect, the image processing program causes the image processing apparatus to perform a process of acquiring, through character recognition, the character string of which region is designated with the first identification mark in the image data, and to which a second identification mark is further added, the second identification mark differing from the first identification mark. Thus, it is possible to favorably suppress erroneous recognition, as compared with a case where only the first identification mark is used to designate a region where character recognition is performed.

Below, the present disclosure will be specifically described.

FIG. 1 schematically illustrates the configuration of the image processing apparatus 10 according to the present embodiment and units that can communicate with the image processing apparatus 10. The image processing apparatus 10 can communicate with a scanner 30 through a communication IF 14. The scanner 30 serves as one example of an image reading apparatus configured to read an image of an original document. The scanner 30 optically reads the original document to generate image data in a predetermined format as a result of reading, and outputs the image data to the image processing apparatus 10.

The image processing apparatus 10 is achieved, for example, with a personal computer, a personal digital assistant such as a smartphone or a tablet, or an information processing device having a processing ability equivalent to these units. Furthermore, hardware that can achieve a control unit 11 according to the present embodiment may be regarded as an image processing apparatus.

The image processing apparatus 10 includes the control unit 11, a display unit 12, an operation receiving unit 13, a communication interface (IF) 14, a storage unit 15, and the like. The control unit 11 is a unit including a CPU 11*a*, a ROM 11*b*, a RAM 11*c*, and the like, and is configured to include one or more ICs, other memories, or the like on an as-necessary basis. The storage unit 15 is, for example, a nonvolatile storage device such as a hard disk drive or a flash memory. The storage unit 15 may be a portion of the control unit 11.

The control unit 11 is configured such that the CPU 11*a* performs a computation process using the RAM 11*c* or the like as a work area in accordance with a program stored in the ROM 11*b*, the storage unit 15, or the like, thereby controlling the behavior of the image processing apparatus 10. The control unit 11 holds an image processing program A as one of programs, and achieves individual functions such as a data acquiring unit 20, a first processing unit 21, or a second processing unit 22, which will be described later, in accordance with the image processing program A.

The image processing program A is an image processing program that causes the control unit 11 to execute a process to image data generated through reading of an original document. Furthermore, the image processing program A is an application program used to perform storage or management of the image data.

The communication IF 14 is an IF configured to perform communication with the outside in a wired manner or wireless manner in accordance with a predetermined communication protocol including a known communication standard. In the example in FIG. 1, the image processing apparatus 10 is coupled to the scanner 30 through the communication IF 14. Furthermore, the image processing apparatus 10 can be coupled to an external network through the communication IF 14 or other communication IFs that are not illustrated in the drawing, and can be coupled to the Internet NW as one example. The image processing program A of the control unit 11 makes it possible to upload image data acquired from the scanner 30, to a storage unit 45 of a cloud server 40 through the Internet NW.

Note that it is not essential that the image processing apparatus 10 is configured to be able to upload image data to the storage unit 45 of the cloud server 40. It may be possible to employ a configuration in which image data can be stored only in the storage unit 15 included in the image processing apparatus 10.

The display unit 12 is a unit used to display visual information, and is configured, for example, with a liquid crystal display (LCD), an organic EL display, or the like. The display unit 12 may be configured to include a display, and a driving circuit used to drive this display. The operation receiving unit 13 is a unit used to receive an operation from a user, and is achieved, for example, with a physical button, a touch panel, a mouse, a keyboard, or the like. It is needless to say that the touch panel may be achieved with one function of the display unit 12. Furthermore, the display unit 12 and the operation receiving unit 13 may be collectively referred to as an operating panel or the like.

A portion of the display unit 12, the operation receiving unit 13, the storage unit 15, and the like illustrated in FIG. 1 may be configured as a peripheral unit provided outside of the image processing apparatus 10. Furthermore, it may be possible to regard, as one image processing apparatus, a system including the image processing apparatus 10 and the scanner 30 illustrated in FIG. 1. Alternatively, the image processing apparatus 10 and the scanner 30 as a whole may be included in one device as an actual condition. When the image processing apparatus 10 and the scanner 30 are included in one device, such a configuration can be referred to as an image processing apparatus. Furthermore, the configuration including the image processing apparatus 10 and the scanner 30 may be a multifunction device having both the function of a printer and the function of a scanner.

Figure 2:
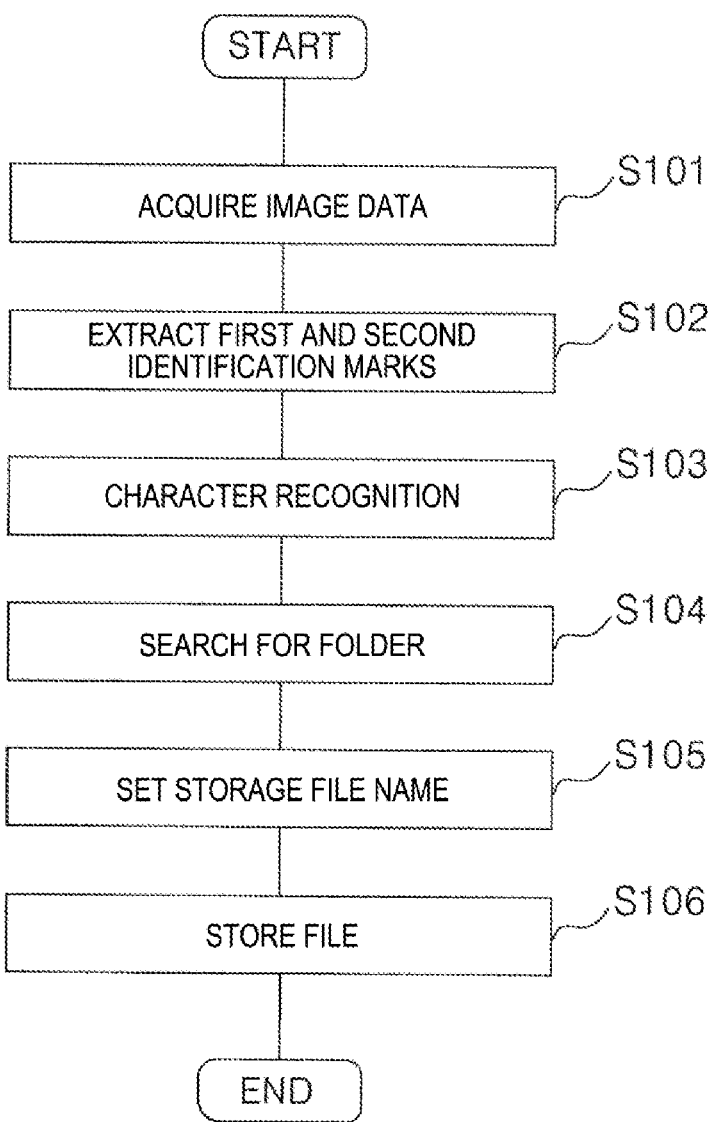
FIG. 2 is a flowchart showing a flow of process achieved by an image processing program.

FIG. 2 illustrates, as a flowchart, a process that the control unit 11 performs in accordance with the image processing program A.

As a stage prior to the step S101 being performed, the scanner 30 first reads an original document set by a user as appropriate to generate image data. Hereinbelow, when the image data is simply referred to, the image data represents image data generated by the scanner 30 reading an original document. In the present example, the original document that a user causes the scanner 30 to read represents an original document on which at least a character is stated. The original document includes various types such as a receipt, an invoice, or a contract. However, below, description will be made using a delivery statement Pa illustrated in FIG. 3 as one example of the original document.

The scanner 30 transmits image data to the image processing apparatus 10. Note that it may be possible to employ a configuration in which the control unit 11 gives the scanner 30 an instruction to start reading of the original document through the communication IF 14, and the scanner 30 starts reading the original document in accordance with the instruction from the control unit 11 to start reading.

The data acquiring unit 20 (see FIG. 1) acquires, through the communication IF 14, the image data transmitted from the scanner 30 as described above (step S101). Note that it may be possible to employ a configuration in which, rather than acquiring the image data directly from the scanner 30, the data acquiring unit 20 acquires the image data from the storage unit 15 serving as one example of a storage unit that is the transfer destination to which the image data is transferred from the scanner 30.

Figure 3:
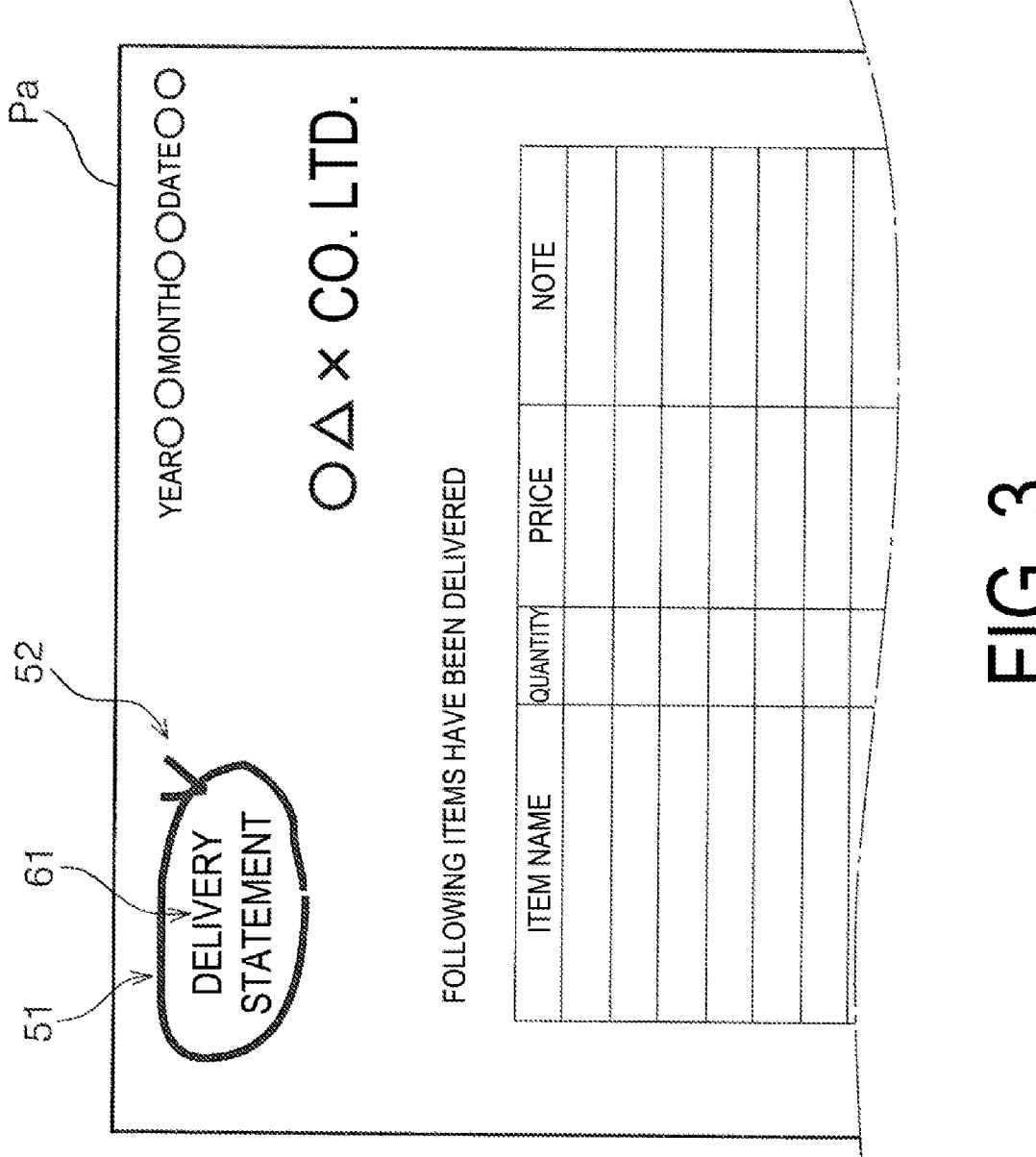
FIG. 3 is a diagram illustrating one example of an original document to be read using a scanner.

Next, the first processing unit 21 (see FIG. 1) performs a first process. As one example, the first process includes step S102 and step S103. In step S102, a first identification mark 51 and a second identification mark 52 illustrated in FIG. 3 are extracted from the image data. In step S103, a character string 61 for which region is designated with the first identification mark 51 is acquired through character recognition. Note that, hereinafter, the character string 61 is referred to as a first character string 61.

The first process defined in steps S102 and S103 in this manner is a process of acquiring, through character recognition, the first character string 61 of which region is designated with the first identification mark 51 in the image data, and the second identification mark 52 differing from the first identification mark 51 is further added to the first character string 61.

In FIG. 3, the first identification mark 51 is comprised of a line surrounding a character string "delivery statement" as one example. In addition, as one example, the line constituting the first identification mark 51 is a line with a color such as red, blue, or green, and can be drawn by a user using a marking pen or the like. It is preferable that colors of the character strings differ from the color of the line that constitutes the first identification mark 51. For example, when the color of character strings is black, it is preferable that the color of the line that constitutes the first identification mark 51 has a color other than black.

The color of the line that constitutes the first identification mark 51 is stored in advance as setting information in the ROM 11*b* (see FIG. 1) or a storage unit such as the storage unit 15 (see FIG. 1). The user knows in advance the color of the line that constitutes the first identification mark 51, for example, through a user interface (UI) displayed on the display unit 12 or an operation manual or the like. Note that it may be possible that the user sets (or changes), on an as-necessary basis, the color of the line that constitutes the first identification mark 51 through the UI on the display unit 12.

In addition, the first identification mark 51 may have any shape, provided that the mark is a line that surrounds a character string, and it may be possible to employ a shape such as a quadrilateral shape or an oval shape. Furthermore, it may be possible to employ a shape in which the starting point and the ending point of the line that constitutes the first identification mark 51 substantially match each other, and the first identification mark 51 is enclosed. In addition, it may be possible to employ a shape in which the starting point and the ending point of the line that constitutes the first identification mark 51 do not match each other, and a portion of the first identification mark 51 is opened. Furthermore, the characteristic of the shape of the first identification mark 51 as described above may be stored in advance as setting information in the ROM 11*b* (see FIG. 1) or a storage unit such as the storage unit 15 (see FIG. 1). In this case, by extracting the first identification mark 51 on the basis of the stored characteristic of the shape of the first identification mark 51, the control unit 11 is able to extract the first identification mark 51 in a more appropriate manner. In addition, in this case, it is preferable that the user knows in advance the preferred shape of the first identification mark 51, for example, through the UI displayed on the display unit 12 or an operation manual or the like.

Furthermore, the first identification mark 51 is not limited to the line surrounding a character string, and may be a mark in which a character string is filled with a highlighter pen or the like.

Next, the second identification mark 52 includes a line intersecting the first identification mark 51 as one example, and is a mark having a size smaller than the first identification mark 51 and having a shape of "v" in the example of FIG. 3, that is, a check mark.

The line that constitutes the second identification mark 52 is a line having a color of red, blue, green, or the like as one example, and can be drawn by a user using a marking pen or the like. It is preferable that colors of the character strings differ from the color of the line that constitutes the second identification mark 52. For example, when the color of character strings is black, it is preferable that the color of the line that constitutes the second identification mark 52 has a color other than black. Note that the color of the line that constitutes the second identification mark 52 may be the same color as the first identification mark 51 or may differ from the color of the first identification mark 51.

The color of the line that constitutes the second identification mark 52 is stored in advance as setting information in the ROM 11*b* (see FIG. 1) or a storage unit such as the storage unit 15 (see FIG. 1). The user knows in advance the color of the line that constitutes the second identification mark 52, for example, through a UI displayed on the display unit 12 or an operation manual or the like. Note that it may be possible that the user sets (or changes), on an as-necessary basis, the color of the line that constitutes the second identification mark 52 through the UI on the display unit 12.

In addition, the second identification mark 52 is added in conjunction with the first identification mark 51, and may have any shape, provided that the shape thereof has a size smaller than the first identification mark 51. Furthermore, the shape thereof is not limited to a check mark as illustrated in FIG. 3, and may have other shapes such as "x" or be a character such as an alphabet. However, it is preferable that the second identification mark 52 is attached by a user, and hence, it is preferable that the second identification mark 52 has a simplified shape.

Furthermore, the characteristic of the shape of the second identification mark 52 as described above may be stored in advance as setting information in the ROM 11*b* (see FIG. 1) or a storage unit such as the storage unit 15 (see FIG. 1). The control unit 11 extracts the second identification mark 52 on the basis of the stored characteristic of the shape of the second identification mark 52.

The user knows in advance the shape of the second identification mark 52, for example, through the UI displayed on the display unit 12 or an operation manual or the like. Note that it may be possible that the user sets (or changes), on an as-necessary basis, the shape of the second identification mark 52 through the UI on the display unit 12.

Furthermore, the position of the second identification mark 52 relative to the first identification mark 51 is disposed at the upper right side in the example of FIG. 3. However, this position may be any position, and may be any of the upper center, the upper left side, the lower right side, the lower center, and the lower left side. In addition, the position of the second identification mark 52 relative to the first identification mark 51 may be stored in advance as setting information in the ROM 11*b* (see FIG. 1) or a storage unit such as the storage unit 15 (see FIG. 1). In this case, by extracting the second identification mark 52 on the basis of the stored information concerning the position of the second identification mark 52 relative to the first identification mark 51, the control unit 11 is able to extract the second identification mark 52 in a more appropriate manner.

In addition, in this case, it is preferable that the user knows in advance the position of the second identification mark 52 relative to the first identification mark 51, for example, through the UI displayed on the display unit 12 or an operation manual or the like. Note that it may be possible that the user sets (or changes), on an as-necessary basis, the position of the second identification mark 52 relative to the first identification mark 51 through the UI on the display unit 12.

Furthermore, in the example in FIG. 3, the second identification mark 52 intersects the first identification mark 51. However, the configuration is not limited to this. The second identification mark 52 may not intersect the first identification mark 51.

Next, in step S103 in FIG. 2, with the target being the image data surrounded by the first identification mark 51 extracted in step S102, character recognition (Optical Character Recognition/Reader: OCR) is performed to acquire the first character string 61, that is, acquire text data on the first character string 61. The character recognition process is a known technique, and hence, detailed explanation will not be provided.

Next, the second processing unit 22 (see FIG. 2) performs a second process. As one example, the second process includes steps S104 to S106.

In step S104, the second processing unit 22 searches for a folder in the storage unit 15 on the basis of the first character string 61 ("delivery statement" in the example in FIG. 3) acquired in step S103. For example, the second processing unit 22 performs a search as to whether or not a folder having a folder name including a character string "delivery statement" exists in the storage unit 15. When such a folder exists in the storage unit 15, this folder is set as the storage destination for the image data. When such a folder does not exist, it may be possible that a folder having a name "delivery statement" is newly created in the example described above, and this folder is the storage destination for the image data. Alternatively, when the folder described above does not exist or when a plurality of the folders described above exist and the storage destination cannot be determined, it may be possible that a temporary folder set in advance is used as the storage destination for the image data.

In step S105, the second processing unit 22 sets a storage file name. The storage file name may take any mode, and it may be possible to set it to "YYYYMMDD_recognition result_RRRR" as one example. Here, the "YYYY" represents the Christian Ear year, the "MM" represents a month, the "DD" represents a date, and the "RRRR" represents a serial number. By referring to the storage destination folder for the image data, the serial number is set as the latest number of files having the same date.

In addition, in step S106, the second processing unit 22 stores image data having a file name set in step S105, in the storage destination folder for the image data set in step S104.

In this manner, the control unit 11 uses the image processing program A to acquire, through character recognition, the first character string 61 of which region is designated with the first identification mark 51 in the image data, and the second identification mark 52 differing from the first identification mark 51 is further added to the first character string 61. Thus, it is possible to favorably suppress erroneous recognition, as compared with a case where the region for character recognition is designated only with the first identification mark 51.

In addition, the second process achieved by the second processing unit 22 is a process of comparing the first character string 61 with a folder name of a folder in the storage unit 15 that stores image data, and storing image data in a folder of which folder name at least partially matches at least a portion of the first character string 61. This eliminates the need for a user to designate the storage destination for image data for each time, which improves the usability.

Note that, when the first character string 61 is compared with a folder name of a folder in the storage unit 15, it is possible to make comparison by employing one of or two or more of a case where a portion of the folder name matches a portion of the first character string 61, a case where a portion of the folder name matches the whole of the first character string 61, a case where the whole of the folder name matches a portion of the first character string 61, and a case where the whole of the folder name matches the whole of the first character string 61.

Note that, when the first character string 61 is compared with a folder name of a folder in the storage unit 15 that stores image data and at least a portion of the folder name does not match at least a portion of the first character string 61, it may be possible to employ a configuration in which a folder of which name is a portion of or the whole of the first character string 61 is newly created, and the image data is stored in this created folder.

Note that, in place of the storage unit 15 that the image processing apparatus 10 includes, the storage destination for image data may be a storage unit 45 that a cloud server 40 includes. In addition, the storage destination for image data may be a storage unit on other networks that are accessible from the image processing apparatus 10. This similarly applies to other embodiments that will be described below.

In addition, in the second process, when the first character string 61 is compared with a designated character string associated with an existing folder and at least a portion of the designated character string matches the first character string 61, the storage destination folder for image data may be a folder corresponding to the designated character string.

For example, it is assumed that a "\nouhin" folder exists in the storage unit 15, and the "delivery statement" serving as a designated character string is associated with this folder, as illustrated in FIG. 4. The first character string 61 is the "delivery statement", and hence, matches the designated character string. Thus, in this case, the image data is stored in the "\nouhin" folder. In addition, in a case where a "\seikyu" folder exists in the storage unit 15 and the "invoice" serving as the designated character string is associated with this folder, image data is stored in the "\seikyu" folder when the first character string 61 acquired through character recognition is the "invoice".

The present example also eliminates the need for a user to designate the storage destination for image data for each time, which improves the usability.

Furthermore, in such a mode, the character string acquired through character recognition and the folder name do not need to be directly associated with each other. Thus, the degree of freedom in setting a folder name increases.

Note that, when the designated character string and the first character string 61 are compared with each other, it is possible to employ one of or two or more of a case where a portion of the designated character string matches a portion of the first character string 61, a case where a portion of the designated character string matches the whole of the first character string 61, a case where the whole of the designated character string matches a portion of the first character string 61, and a case where the whole of the designated character string matches the whole of the first character string 61, and make comparison.

Furthermore, the number of the designated character strings associated with one existing folder is not limited to one, and may be two or more. For example, in addition to the "delivery statement", another character string such as "delivery note" may be set for the designated character string associated with the "\nouhin" folder.

The relationship between the folder in the storage unit 15 and the designated character string as described above is stored in advance as setting information in the ROM 11b (see FIG. 1) or a storage unit such as the storage unit 15 (see FIG. 1). The control unit 11 searches for the designated character string on the basis of the character string acquired through character recognition. When the applicable designated character string exists, the control unit 11 selects a folder corresponding to this designated character string as the storage destination for image data.

Note that it may be possible that the user sets (or changes), on an as-necessary basis, the relationship between the existing folder and the designated character string through the UI on the display unit 12.

Next, an example in which a plurality of character strings are recognized will be described with reference to FIG. 5.

Figure 5:
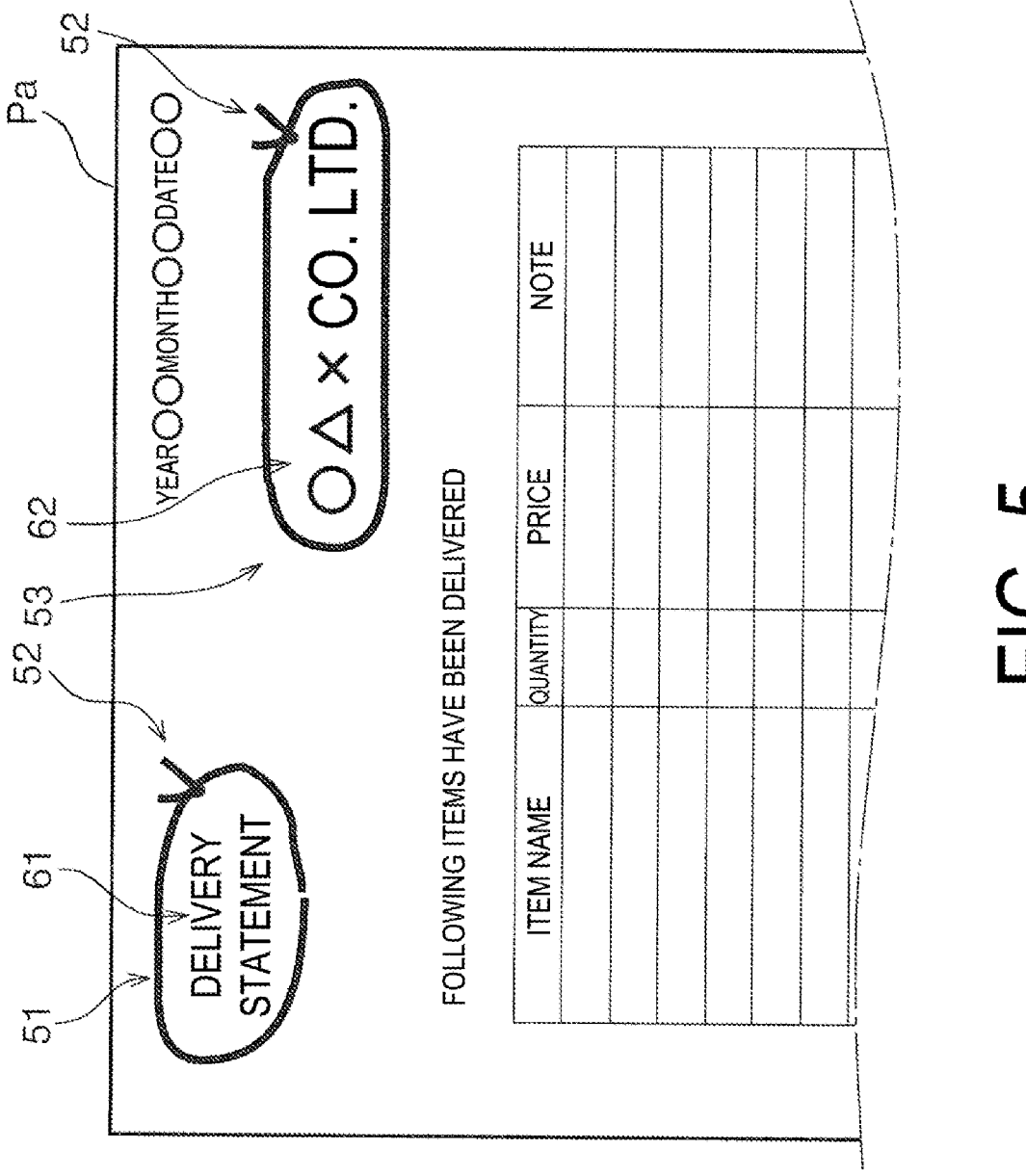
FIG. 5 is a diagram illustrating one example of an original document to be read using a scanner.

In FIG. 5, the reference character 62 represents a second character string differing from the first character string 61. In addition, the reference character 53 represents a third identification mark disposed at a position differing from the first identification mark 51. In FIG. 5, the third identification mark 53 is comprised of a line surrounding a character string "○ΔxCo. Ltd." (second character string 62) as one example.

The line that constitutes the third identification mark 53 is a line having a color of red, blue, green, or the like as one example, and can be drawn by a user using a marking pen or the like. It is preferable that colors of the character strings differ from the color of the line that constitutes the third identification mark 53. For example, when the color of character strings is black, it is preferable that the color of the line that constitutes the third identification mark 53 has a color other than black.

In addition, the color of the line that constitutes the third identification mark 53 needs to differ from the color of the line that constitutes the first identification mark 51. The purpose of this is to distinguish the first identification mark 51 and the third identification mark 53 from each other.

Furthermore, the color of the line that constitutes the third identification mark 53 may be stored in advance as setting information in the ROM 11*b* (see FIG. 1) or a storage unit such as the storage unit 15 (see FIG. 1). The user knows in advance the color of the line that constitutes the third identification mark 53, for example, through a user interface (UI) displayed on the display unit 12 or an operation manual or the like. Note that it may be possible that a user sets (or changes), on an as-necessary basis, the color of the line that constitutes the third identification mark 53 through the UI on the display unit 12.

In addition, the shape and the like of the third identification mark 53 are similar to those of the first identification mark 51 described above.

Furthermore, the second identification mark 52 is attached to the third identification mark 53 as with the first identification mark 51. The second identification mark 52 added to the third identification mark 53 is similar to the second identification mark 52 added to the first identification mark 51, and hence, additional explanation will not be provided here.

One example of a process of recognizing a plurality of character strings will be described with reference to FIG. 6.

Steps S201 and S202 are similar to steps S101 and S102 described above with reference to FIG. 2, and hence, additional explanation will not be provided.

The first process performed by the first processing unit 21 (see FIG. 1) includes steps S202 to S205.

In step S203, the first processing unit 21 extracts the third identification mark 53 and the second identification mark 52 illustrated in FIG. 5 in the image data. Then, in step S204, character recognition is performed for the first character string 61, and in step S205, character recognition is performed for the second character string 62.

Next, the second process performed by the second processing unit 22 (see FIG. 1) includes steps S206 to S208.

In step S206, the second processing unit 22 sets a storage file name at the time of storing the image data on the basis of the first character string 61.

The storage file name can be set, for example, to "YYYYMMDD_first character string 61_RRRR". Here, the "YYYY" represents the Christian Ear year, the "MM" represents a month, the "DD" represents a date, and the "RRRR" represents a serial number. By referring to the storage destination folder for the image data, the serial number is set as the latest number of files having the same date.

Next, in step S207, the second processing unit 22 searches for a folder in the storage unit 15 on the basis of the second character string 62. For example, the second processing unit

22 performs a search as to whether or not a folder having a folder name including a portion of or the whole of the character string "○ΔxCo. Ltd." exists in the storage unit 15. When such a folder exists in the storage unit 15, this folder is set as the storage destination for the image data. Note that, when the folder described above does not exist, it may be possible that a folder having a name "○ΔxCo. Ltd." is newly created in the example described above, and this folder is set as the storage destination for the image data. Alternatively, when the existing folder described above does not exist or when a plurality of the folders described above exist and the storage destination cannot be determined, it may be possible that a temporary folder set in advance is used as the storage destination for the image data.

Then, in step S208, the second processing unit 22 stores image data having a file name set in step S206, in the storage destination folder for the image data set in step S207.

In this manner, in the present example, the control unit 11 performs the first process of acquiring, through character recognition, the second character string 62 of which region is designated with the third identification mark 53 disposed at a position differing from the first identification mark 51 in the image data, the second identification mark 52 being further added to the character string, and also performs the second process using the first character string 61 and the second character string 62 acquired in the first process.

That is, in addition to the first character string 61, by using the second character string 62 differing from the first character string 61, it is possible to expand a variation in the second process, which makes it possible to further improve the usability.

Furthermore, in the example described above, the second process includes a process of setting the file name of the image data to be a file name including the first character string 61, and also includes a process of comparing the second character string 62 with a folder name of the folder in the storage unit 15 that stores the image data, and storing the image data in a folder of which folder name at least partially matches at least a portion of the second character string 62.

This eliminates the need for a user to designate the file name for image data as well as the storage destination for the image data for each time, which improves the usability.

Note that, when the second character string 62 is compared with a folder name of a folder in the storage unit 15, it is possible to employ one of or two or more of a case where a portion of the folder name matches a portion of the second character string 62, a case where a portion of the folder name matches the whole of the second character string 62, a case where the whole of the folder name matches a portion of the second character string 62, and a case where the whole of the folder name matches the whole of the second character string 62, and make comparison.

Note that, in the example described above with reference to FIGS. 5 and 6, the first character string 61 is used to set a storage file name, and the second character string 62 is used to determine the storage destination folder. However, it may be possible to use both of the strings to set the file name or use both of the strings to determine the storage destination folder.

In addition, in the example in FIG. 5, two character strings of the first character string 61 and the second character string 62 are acquired. However, it may be possible to acquire three or more character strings. That is, in addition to the first identification mark 51 and the third identification mark 53, it may be possible to further use one or more identification marks to designate a character for use in character recognition.

Furthermore, similarly to those described with reference to FIG. 4, in the present example, it may be possible that a designated character string associated with an existing folder is compared with the second character string 62 acquired through character recognition to set the storage destination for image data.

That is, the second process may include a process of setting a file name for image data to be a file name including the first character string 61, and also includes a process of comparing the second character string 62 with the designated character string associated with an existing folder in the storage unit 15 that stores the image data, and when at least a portion of the designated character string matches at least a portion of the second character string 62, storing the image data in the folder corresponding to the designated character string.

This eliminates the need of the second character string 62 acquired through character recognition being directly associated with the folder name. Thus, the degree of freedom in setting the folder name improves.

Note that, when the second character string 62 is compared with a designated character string, it is possible to employ one of or two or more of a case where a portion of the designated character string matches a portion of the second character string 62, a case where a portion of the designated character string matches the whole of the second character string 62, a case where the whole of the designated character string matches a portion of the second character string 62, and a case where the whole of the designated character string matches the whole of the second character string 62, and make comparison.

Furthermore, in the example described above, the second process uses the first character string 61 and the second character string 62 in the process of storing image data. However, it is needless to say that the second process is not limited to this. For example, when the first character string 61 is a name of an organization or a user name, and the second character string 62 relates to a schedule, it may be possible to apply the first character string 61 and the second character string 62 to a schedule management serve. For example, it is possible to use the first character string 61 to select an organization or a user for which schedule is registered and use the second character string 62 to register the schedule.

It is needless to say that the present disclosure is not limited to each embodiment described above or modification examples, and various modifications are possible within the scope of the present disclosure as described in the appended claims, which also fall within the scope of the present disclosure.

For example, when image data is stored, it may be possible to delete the first identification mark 51, the second identification mark 52, and the third identification mark 53 described above from the image data.

In addition, when erroneous recognition is less likely to occur even if the second identification mark 52 is not used, for example, when the first identification mark 51 or the third identification mark 53 has a distinctive shape, it is possible to omit the second identification mark 52.

What is claimed is:

1. An image processing apparatus comprising:
a central processing unit (CPU) configured to acquire image data generated through reading of an original document, and acquire, through character recognition, a first character string included in the image data, wherein the image data includes a second character string which differs from the first character string, the CPU is configured to perform a first process and a second process, in the first process, the CPU is configured to;
acquire, through the character recognition, the first character string of which region is designated with a first identification mark in the image data, and to which a second identification mark is further added, the second identification mark differing from the first identification mark, and acquire, through the character recognition, the second character string of which region is designated with a third identification mark in the image data, the third identification mark is at a position differing from the first identification mark, the third identification mark having a color differing from the first identification mark, the second identification mark is further added to the second character string, in the second process, the CPU is configured to perform a process using the first character string and the second character string acquired in the first process, and the second process includes:
a process of setting a file name of the image data to be a file name including the first character string; and a process of comparing the second character string with a first folder name of a first folder in a storage unit that stores the image data, and storing the image data in the first folder having the first folder name, at least a portion of the first folder name matching at least a portion of the second character string.

2. The image processing apparatus according to claim 1, wherein
the second process further includes a process of comparing the first character string with a second folder name of a second folder in the storage unit that stores the image data, and storing the image data in the second folder having the second folder name, at least a portion of the second folder name matching at least a portion of the first character string.

3. The image processing apparatus according to claim 2, wherein the storage unit is a storage unit included in a cloud server.

4. The image processing apparatus according to claim 1, wherein
the second process further includes a process of comparing the first character string with a designated character string associated with a second folder in the storage unit that stores the image data, and, when at least a portion of the designated character string matches the first character string, storing the image data in the second folder corresponding to the designated character string.

5. The image processing apparatus according to claim 1, wherein
the second process further includes
a process of comparing the second character string with a designated character string associated with an existing folder in the storage unit that stores the image data, and, when at least a portion of the designated character string matches at least the portion of the second character string, storing the image data in a second folder corresponding to the designated character string.

6. The image processing apparatus according to claim 1, wherein the first identification mark is a line of a predetermined color, and is configured to include a line surrounding the first character string, the second identification mark includes a line intersecting the first identification mark and is a mark smaller than a size of the first identification mark, and when the second identification mark is added together with the first identification mark, the CPU is further configured to acquire, through the character recognition, the first character string of which region is designated with the first identification mark.

7. A non-transitory computer-readable storage medium storing an image processing program that causes an image processing apparatus to perform a process to image data generated through reading of an original document, the image processing program causing the image processing apparatus to perform:

a first process of:

acquiring, through character recognition, a first character string of which region is designated with a first identification mark in the image data, and to which a second identification mark is further added, the second identification mark differing from the first identification mark, wherein the image data includes a second character string which differs from the first character string; and acquiring, through the character recognition, the second character string of which region is designated with a third identification mark in the image data, the third identification mark is at a position differing from the first identification mark, the third identification mark having a color differing from the first identification mark, the second identification mark is further added to the second character string; and a second process using the first character string and the second character string acquired in the first process, wherein the second process includes:

a process of setting a file name of the image data to be a file name including the first character string; and a process of comparing the second character string with a folder name of a folder in a storage unit that stores the image data, and storing the image data in the folder having the folder name, at least a portion of the folder name matching at least a portion of the second character string.

8. An image processing apparatus comprising:

a central processing unit (CPU) configured to acquire image data generated through reading of an original document, and acquire, through character recognition, a first character string included in the image data, wherein the image data includes a second character string which differs from the first character string, the CPU is configured to perform a first process and a second process, in the first process, the CPU is configured to:

acquire, through the character recognition, the first character string of which region is designated with a first identification mark in the image data, and to which a second identification mark is further added, the second identification mark differing from the first identification mark, and acquire, through the character recognition, the second character string of which region is designated with a third identification mark in the image data, the third identification mark is at a position differing from the first identification mark, the third identification mark having a color differing from the first identification mark, the second identification mark is further added to the second character string, in the second process, the CPU is configured to perform a process using the first character string and the second character string acquired in the first process, and the second process includes:

a process of setting a file name of the image data to be a file name including the first character string; and a process of comparing the second character string with a designated character string associated with an existing folder in a storage unit that stores the image data, and, when at least a portion of the designated character string matches at least a portion of the second character string, storing the image data in the existing folder corresponding to the designated character string.

9. The image processing apparatus according to claim 8, wherein the second process further includes a process of comparing the first character string with a folder name of a folder in the storage unit that stores the image data, and storing the image data in the folder having the folder name, at least a portion of the folder name matching at least a portion of the first character string.

10. The image processing apparatus according to claim 9, wherein the storage unit is a storage unit included in a cloud server.

11. The image processing apparatus according to claim 8, wherein the second process further includes a process of comparing the first character string with the designated character string associated with the existing folder in the storage unit that stores the image data, and, when at least the portion of the designated character string matches the first character string, storing the image data in the folder corresponding to the designated character string.

12. The image processing apparatus according to claim 8, wherein the second process includes a process of comparing the second character string with a folder name of a folder in the storage unit that stores the image data, and storing the image data in a folder having the folder name, at least a portion of the folder name matching at least the portion of the second character string.

13. The image processing apparatus according to claim 8, wherein the first identification mark is a line of a predetermined color, and is configured to include a line surrounding the first character string, the second identification mark includes a line intersecting the first identification mark and is a mark smaller than a size of the first identification mark, and when the second identification mark is added together with the first identification mark, the CPU is further configured to acquire, through the character recognition, the first character string of which region is designated with the first identification mark.

* * * * *